Patented Aug. 20, 1929.

1,725,363

UNITED STATES PATENT OFFICE.

FRANK A. McDERMOTT, OF CLAYMONT, DELAWARE, ASSIGNOR TO E. I. DU PONT DE NEMOURS AND COMPANY, OF WILMINGTON, DELAWARE, A CORPORATION OF DELAWARE.

PRODUCTION OF GLYCERIN BY FERMENTATION.

No Drawing.  Application filed November 7, 1922. Serial No. 599,574.

This invention relates to that production of glycerin from a sugar mash by fermentation wherein there are added to said mash from time to time certain salts or alkaline substances capable of promoting the formation of glycerin, and comprises the addition of such salts or alkaline substances dissolved in an aqueous solution of a fermentable sugar, and particularly in an aqueous sugar solution whose sugar content is about the same as that of the mash undergoing fermentation.

In the course of my work on the production of glycerin by fermentation I perceived the desirability of developing a satisfactory method for adding the alkali (e. g. soda ash) in solution instead of the solid form. If this could be done it would make the operation of adding the soda ash much less objectionable than at present as the light ash tends to dust very readily and in consequence not only is there a loss of ash owing to the material thus escaping from the mixing apparatus, but the air of the rooms in which the soda mixing apparatus is located is so full of soda dust as to make it extremely objectionable to work in, most of the operators finding the use of dust masks necessary. However, all fermentations previously made in which the soda has been added in solution instead of in the solid form have consistently given lower yields of glycerin than the controls run according to the usual procedure, and in some cases a decrease in the yield of both alcohol and glycerin has been noted. Attempts were made to overcome this difficulty, which appeared to be due to the dilution of the mash by the soda solution, by a reduction in the initial volume of the mash, while using the same amount of molasses, the reduction in the volume being equivalent to the amount of water used in making the soda solution. Better results were not obtained by this modification, however, and it has generally been assumed that the soda ash could not be added in solution with as satisfactory results in so far as the yield from the fermentation is concerned as when the soda is added in solid form.

It may be noted that the solubility of sodium carbonate in water reaches a maximum of about 45% at about 40° C., the solubility being somewhat less at higher temperatures and dropping off rapidly at lower temperatures. As our fermentations are run at a temperature of about 30-35° C. it has not been considered practical to use a more concentrated solution than 40%, held at a temperature of 30° C., and any material evaporation from this solution results in crystallization of soda.

Apparently the chief factors tending to reduce the yields with the above-mentioned modified process are the change in concentration of the solution resulting from the addition of the soda solution in the case of mashes made in the usual way, and the slower fermentation and generally unfavorable effect of the higher concentration of sugar, etc., at the start, when the mashes are made up more concentrated than for the usual method. It occurred to me that it might be possible to avoid the dilution and resulting decrease in yield by dissolving the soda in a solution of molasses of the same concentration as the initial mash. In preliminary experiments I found that a solution of 300 g. of molasses in 700 cc. of water will dissolve 300 g. of anhydrous sodium carbonate and retain the latter in solution at 30° C. or even somewhat lower; practically it is advantageous to dissolve the soda in the water at a temperature somewhat above 30° C.—even as high as 50° C.—and then to add the molasses when the solution has cooled to between about 30 and 35° C. Such solutions are apparently fairly stable at the temperatures at which they are used, around 30° C., and showed no evidence of serious decomposition; there was a slight precipitation and the development of a slight ammoniacal odor. Nef is said to have stated that an alkaline solution of glucose may contain as many as 128 different substances, and it is known that glucose is destroyed quite rapidly in hot alkaline solution, but as more than half of the sugar in cane molasses is probably sucrose, which is not readily destroyed under these conditions, there would be no great reduction in the percentage of fermentable sugar present.

To illustrate my invention I shall describe four typical experiments which have been run in accordance with this process, the final weight of mash in each experiment being 8 kilos. In each of these experiments there was used an initial mash of 7200 grams of 30% black strap molasses solution containing 0.5% of ammonium sulfate; of this amount, 6165 g. were placed in a flask and sterilized, while the remaining 1035 grams were placed in another flask, sterilized, cooled and to the cool sterile solution was then added (in experiments 1 and 2) 320 grams of soda ash and (experiments 3 and 4) 374 grams of crude potassium salts from molasses ash. Each lot of 6165 grams was inoculated with 800 grams of culture of so-called yeast No. 16 in a molasses solution of the same concentration, and when the fermentations had become active the solution of soda ash or potassium salts in the balance of the mash was added in four equal portions at suitable intervals, usually 2 to 4 hours, each succeeding addition being made during the period of vigorous fermentation following the preceding dose of the alkaline molasses solution. The results obtained on the analysis of the fermented liquor in these four experiments are shown on the following table:

TABLE I.

| No. | Total mash seeded | Grams sugar in mash | Final sp. gr. at 26/4° C. | % sugar orig. | % resid. sugar | % alc. by wt. | % glyc. by wt. |
|---|---|---|---|---|---|---|---|
| 1 | 8000 | 1128 | 1.072 | 14.11 | 1.50 | 4.88 | 3.40 |
| 2 | 8000 | 1128 | 1.063 | 14.11 | 1.50 | 4.93 | 3.36 |
| 3 | 8000 | 1128 | 1.056 | 14.11 | 1.28 | 5.10 | 3.42 |
| 4 | 8000 | 1128 | 1.064 | 14.11 | 1.07 | 5.07 | 3.30 |

TABLE I (Cont.).

| % of total sugar converted to— | | Total (100% alcohol) | % of fermented sugar converted to— | | Total (100% alcohol) |
|---|---|---|---|---|---|
| Alc. by wt. | Glcy. by wt. | | Alcohol (100%) by wt. | Glycerin | |
| 34.6 | 24.1 | 58.7 | 38.9 | 27.2 | 66.1 |
| 35.0 | 23.8 | 58.8 | 39.1 | 26.6 | 65.7 |
| 36.2 | 24.2 | 60.4 | 39.7 | 26.6 | 66.3 |
| 36.0 | 23.4 | 59.4 | 38.9 | 25.3 | 64.2 |

It is obvious that the results need not be confined to sodium carbonate but potassium carbonate or other alkaline salts of sufficient solubility may be used instead, or soluble salts, whether alkaline or not, such as those which may be recovered from the ash of molasses as described in the application of J. W. Lawrie, Serial No. 577,992, may be employed. Furthermore, instead of yeast No. 16, described in detail in my patent 1,551,997 issued September 1, 1925, there may be used various other yeasts such as *Saccharomyces ellipsoideus* and in general any yeast capable of producing glycerin in commercially recoverable amounts.

In the Eoff Patent 1,288,398 it is stated that potassium carbonate or other alkaline salts may be used in place of sodium carbonate. Ordinarily sodium carbonate is, of course, a very much cheaper source of alkali than potassium carbonate, but in view of recent developments such as that described in the above mentioned Lawrie application it is probable that some of the salts specified above may be found more economical due to the possibility of recovering by-products. As disclosed in said Lawrie application, in the process of recovering the glycerin from a fermented molasses mash, there is left after evaporation of the mash a dry, glycerin-free residue which can be very readily burned. The ash from the burning of this residue contains the potash salts, and these salts can be recovered by solution in any well-known manner. By adding to the mash undergoing fermentation a solution of the soluble salts present in the above mentioned ash, there may be obtained an excellent yield of glycerin. My investigations have shown that normal yields of glycerin may be obtained by using potassium carbonate in solution in place of sodium carbonate, even when the concentration of potassium carbonate is only 50% in the solution used.

The total amount of sodium carbonate or other salt added should ordinarily be between 20% and 35% of the total sugar to be fermented, that is, the sum of the sugar in the mash initially and the sugar in the salt solution added during the fermentation.

As will be understood, the conditions of operation are not limited to these specific values given above, but may be varied considerably without departing from my invention.

Where the words "favorable" or "optimum" are employed in the appended claims in connection with the concentration of the mash, it is intended to indicate thereby such concentrations as are most favorable to the production of glycerin by the fermentation process as hereinabove described.

I claim:

1. In that process of producing glycerin by the fermentation by yeast of a mash containing a solution of a yeast fermentable sugar, which includes the addition to the mash, at intervals during said fermentation, of successive doses of a material capable of promoting such formation of glycerin, the modification which comprises adding to said mash at intervals during said fermentation the several portions of said material in the form of water solutions thereof, each of said solutions containing such an amount of sugar dissolved therein that the addition of each of said water solutions will not decrease the ratio of sugar to water in the resulting mash.

2. The process as set forth in claim 1 in which fermentation is brought about by yeast No. 16.

3. A process as set forth in claim 1 in which the material capable of promoting the formation of glycerin is a salt having an alkaline reaction.

4. A process as defined in claim 1 in which the material capable of promoting the formation of gylcerin is an alkali-metal carbonate.

5. In the process of producing glycerin by subjecting to yeast-fermentation a 30% black strap molasses solution while adding successive doses of an alkali-metal carbonate totalling from about 20 to 35% of the sugar to be fermented, the step which comprises adding said carbonate dissolved in an aqueous solution containing about 30% of black strap molasses.

6. In the production of glycerin by yeast fermentation of a mash containing in solution an optimum amount of a yeast fermentable sugar and material adapted to promote such formation of glycerin, the process of adding to the undergoing fermentation successive doses of a water solution of said sugar and said material, said doses being added at such intervals during the progress of the fermentation as to substantially maintain the concentration of sugar and material within the optimum range throughout the fermentation.

7. The process as set forth in claim 6 in which the solution comprising the doses has a sugar concentration substantially equal to that of the mash undergoing fermentation, but a relatively high concentration of material adapted to promote the formation of glycerin.

8. In the production of glycerin by yeast fermentation of a mash containing in solution favorable amounts of a yeast fermentable sugar and material adapted to promote such formation of glycerin, the process of adding to the original mash during the progress of the fermentation, successive doses of a water solution of said sugar and said material, said doses being of small volume relative to the original mash but of high relative concentration.

9. In the process of producing glycerin by subjecting to yeast-fermentation a mash containing in solution an optimum amount of the yeast fermentable sugar, the step which comprises adding a material capable of promoting the formation of glycerin, said material being added dissolved in an aqueous solution of a yeast-fermentable sugar, said solution having substantially the same sugar concentration as the fermenting mash.

10. The process as set forth in claim 5 in which fermentation is brought about by yeast No. 16.

In testimony whereof I affix my signature.

FRANK A. McDERMOTT.

CERTIFICATE OF CORRECTION.

Patent No. 1,725,363.                               Granted August 20, 1929, to

FRANK A. McDERMOTT.

It is hereby certified that error appears in the printed specification of the above numbered patent requiring correction as follows: Page 3, line 17, claim 6, after the article "the" insert the word "mash"; lines 37 and 38, strike out the words "original mash during the progress of the" and insert instead "mash undergoing"; and the said Letters Patent should be read with these corrections therein that the same may conform to the record of the case in the Patent Office.

Signed and sealed this 15th day of October, A. D. 1929.

(Seal)

M. J. Moore,
Acting Commissioner of Patents.

mation of glycerin is an alkali-metal carbonate.

5. In the process of producing glycerin by subjecting to yeast-fermentation a 30% black strap molasses solution while adding successive doses of an alkali-metal carbonate totalling from about 20 to 35% of the sugar to be fermented, the step which comprises adding said carbonate dissolved in an aqueous solution containing about 30% of black strap molasses.

6. In the production of glycerin by yeast fermentation of a mash containing in solution an optimum amount of a yeast fermentable sugar and material adapted to promote such formation of glycerin, the process of adding to the undergoing fermentation successive doses of a water solution of said sugar and said material, said doses being added at such intervals during the progress of the fermentation as to substantially maintain the concentration of sugar and material within the optimum range throughout the fermentation.

7. The process as set forth in claim 6 in which the solution comprising the doses has a sugar concentration substantially equal to that of the mash undergoing fermentation, but a relatively high concentration of material adapted to promote the formation of glycerin.

8. In the production of glycerin by yeast fermentation of a mash containing in solution favorable amounts of a yeast fermentable sugar and material adapted to promote such formation of glycerin, the process of adding to the original mash during the progress of the fermentation, successive doses of a water solution of said sugar and said material, said doses being of small volume relative to the original mash but of high relative concentration.

9. In the process of producing glycerin by subjecting to yeast-fermentation a mash containing in solution an optimum amount of the yeast fermentable sugar, the step which comprises adding a material capable of promoting the formation of glycerin, said material being added dissolved in an aqueous solution of a yeast-fermentable sugar, said solution having substantially the same sugar concentration as the fermenting mash.

10. The process as set forth in claim 5 in which fermentation is brought about by yeast No. 16.

In testimony whereof I affix my signature.

FRANK A. McDERMOTT.

CERTIFICATE OF CORRECTION.

Patent No. 1,725,363.    Granted August 20, 1929, to

FRANK A. McDERMOTT.

It is hereby certified that error appears in the printed specification of the above numbered patent requiring correction as follows: Page 3, line 17, claim 6, after the article "the" insert the word "mash"; lines 37 and 38, strike out the words "original mash during the progress of the" and insert instead "mash undergoing"; and the said Letters Patent should be read with these corrections therein that the same may conform to the record of the case in the Patent Office.

Signed and sealed this 15th day of October, A. D. 1929.

(Seal)

M. J. Moore,
Acting Commissioner of Patents.